(12) United States Patent
Hartkorn

(10) Patent No.: US 9,566,752 B2
(45) Date of Patent: Feb. 14, 2017

(54) METHODS OF FORMING A TIR OPTICAL FIBER LENS

(71) Applicant: Corning Incorporated, Corning, NY (US)

(72) Inventor: Klaus Hartkorn, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 655 days.

(21) Appl. No.: 13/913,775

(22) Filed: Jun. 10, 2013

(65) Prior Publication Data

US 2014/0346693 A1    Nov. 27, 2014

Related U.S. Application Data

(60) Provisional application No. 61/826,152, filed on May 22, 2013.

(51) Int. Cl.
| | | |
|---|---|---|
| *B23K 26/38* | (2014.01) | |
| *B29D 11/00* | (2006.01) | |
| *G01J 1/04* | (2006.01) | |
| *G02B 6/26* | (2006.01) | |
| *B23K 26/00* | (2014.01) | |
| *B23K 26/40* | (2014.01) | |

(52) U.S. Cl.
CPC ..... *B29D 11/00692* (2013.01); *B23K 26/0006* (2013.01); *B23K 26/0081* (2013.01); *B23K 26/38* (2013.01); *B23K 26/40* (2013.01); *G01J 1/0425* (2013.01); *G02B 6/262* (2013.01); *B23K 2201/32* (2013.01); *B23K 2203/50* (2015.10); *B23K 2203/54* (2015.10)

(58) Field of Classification Search
CPC .................................. B29D 11/00; G01J 1/04
USPC ....................... 65/387; 264/1.27; 250/227.11
See application file for complete search history.

(56) References Cited

U.S. PATENT DOCUMENTS

| | | | |
|---|---|---|---|
| 6,904,197 B2 | 6/2005 | Bhagavatula et al. | |
| 9,089,931 B1* | 7/2015 | Carberry | G02B 6/25 |
| 2002/0009261 A1 | 1/2002 | Bhagavatula et al. | |
| 2002/0076152 A1 | 6/2002 | Hughes et al. | |
| 2003/0165290 A1* | 9/2003 | Bhagavatula | G02B 6/2552 385/33 |
| 2003/0165291 A1* | 9/2003 | Bhagavatula | G02B 6/2552 385/33 |
| 2004/0156585 A1* | 8/2004 | Matusick | G02B 6/2552 385/33 |

(Continued)

FOREIGN PATENT DOCUMENTS

| | | |
|---|---|---|
| EP | 1285294 | 3/2001 |
| EP | 1481274 | 4/2006 |
| EP | 2329759 | 6/2011 |

OTHER PUBLICATIONS

PCT/US2014/038535 Search Report.

*Primary Examiner* — Mark Halpern
(74) *Attorney, Agent, or Firm* — Robert L. Carlson

(57) ABSTRACT

Methods of forming a total-internal-reflection (TIR) optical fiber lens are disclosed. The methods include heating an end of an optical fiber with a defocused infrared laser beam to form a bulbous tip having a curved outer surface that defines a lens surface. The bulbous tip is laser cleaved to define a TIR facet. Light traveling in the fiber diverges at an effective fiber end and is reflected by the TIR facet through the lens surface to form an image at an image plane.

19 Claims, 7 Drawing Sheets

(56) References Cited

U.S. PATENT DOCUMENTS

2006/0067620 A1* 3/2006 Shishkov ............ A61B 5/0066
385/38

* cited by examiner

METHODS OF FORMING A TIR OPTICAL FIBER LENS

CROSS-REFERENCE TO RELATED APPLICATIONS

This application claims the benefit of priority under 35 U.S.C. §119 of U.S. Provisional Application Ser. No. 61/826,152, filed on May 22, 2013, the content of which is relied upon and incorporated herein by reference in its entirety.

FIELD

The present disclosure relates to optical fibers and in particular to methods of forming lenses for optical fibers.

BACKGROUND

Optical fibers are used for a wide range of optics- and optics-electronics-based applications and systems. In essentially all such applications and systems, light needs to be coupled into and out of the optical fiber in some manner.

One way light is coupled into and out of optical fibers is through the use of optical fiber lenses. An optical fiber lens is a lens that resides at an end of an optical fiber. The optical fiber lens serves to couple light into and/or out of the optical fiber according to the particular needs of the system or application. Optical fiber lenses are used, for example, in optical fiber connectors and optical-coherence-tomography applications.

Several types of optical fiber lenses that are available have light-turning capability. However, such lenses include separate molded parts such as mirrors and lenses that need to be added to the optical fiber. The need for manufacturing separate parts and aligning them during manufacturing adds cost to the fiber-lens system.

SUMMARY

An aspect of the disclosure is a method of forming a faceted TIR optical fiber lens on an end of an optical fiber having a first axis. The method includes heating the fiber end to form a bulbous tip; allowing the bulbous tip to cool, the bulbous tip having a refractive index, a center and a curved outer surface; and laser cleaving the cooled bulbous tip to form a facet that intersects the first axis at a facet angle $\theta$ that defines the facet as a TIR surface.

Another aspect of the disclosure is the method described above, wherein the facet angle is in a range defined by $25° \leq \theta \leq 46°$.

Another aspect of the disclosure is a method of forming a faceted TIR optical fiber lens on an end of an optical fiber having a first axis. The method includes heating the fiber end with a defocused infrared laser beam to form a bulbous tip having a refractive index, a center and a curved outer surface having a radius of curvature R, wherein $70\ \mu m \leq R \leq 500\ \mu m$; allowing the bulbous tip to cool; and laser cleaving the bulbous tip to define a totally internally reflecting facet for light traveling along the first axis, wherein the curved outer surface and the refractive index define a focal length f of the TIR lens, wherein $100\ \mu m \leq f \leq 500\ \mu m$.

Another aspect of the disclosure is a method of transmitting and detecting light from a light source. The method includes operably arranging the light source relative to a faceted total-internal-reflection (TIR) optical fiber lens that is integrally formed at an end of the optical fiber. The faceted TIR optical fiber lens is defined by a bulbous tip having a curved outer surface and a facet that defines a TIR surface. The facet defines a second axis that intersects the first axis. The method also includes coupling light into the faceted TIR optical fiber lens along one of the first and second axes, and detecting the light along the other of the first and second axes.

Additional features and advantages are set forth in the Detailed Description below, and in part will be readily apparent to those skilled in the art from the description or recognized by practicing the embodiments as described in the written description and claims hereof, as well as the appended drawings. It is to be understood that both the foregoing general description and the following Detailed Description are merely exemplary and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s) and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute a part of this Detailed Description.

The entire disclosure of any publication or patent document mentioned herein is incorporated by reference.

The notation "µm" is used herein as an abbreviation for "micron" or "microns."

Figure 1:
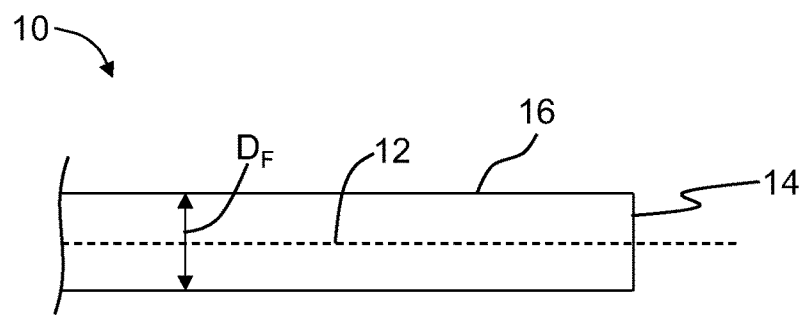
FIG. 1 is a side view of an example optical fiber used to form the TIR optical fiber lens disclosed herein.

FIG. 1 is a side view of a section of an example optical fiber ("fiber") 10 used to form the faceted TIR optical fiber lens ("TIR lens") disclosed herein as described below. The fiber 10 has a first (central) axis 12, an end 14 and an outer surface 16. The fiber 10 also has a core 19 surrounded by a cladding 21. The fiber end 14 is prepared by stripping, cleaving and cleaning fiber 10 so that only the glass portions of the fiber (core 19 and cladding 21) remain. The fiber 10 has a diameter $D_F$, which in one example is nominally 62.5 microns.

Figure 2:
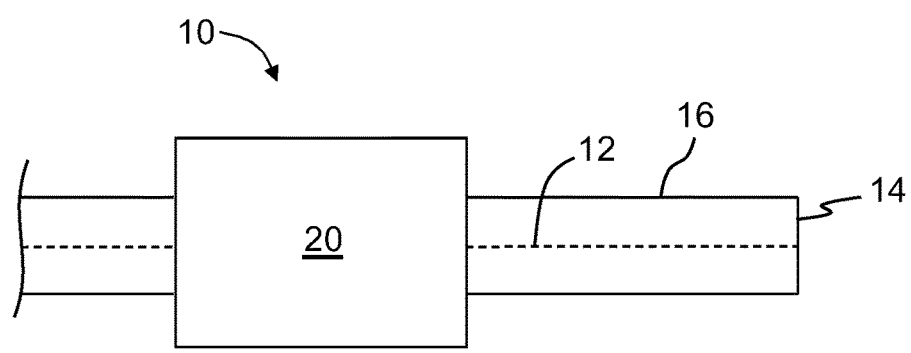
FIG. 2 is a side view of the optical fiber of FIG. 1 as operably arranged in a fiber support structure so that the fiber end can be processed.
Figure 3:
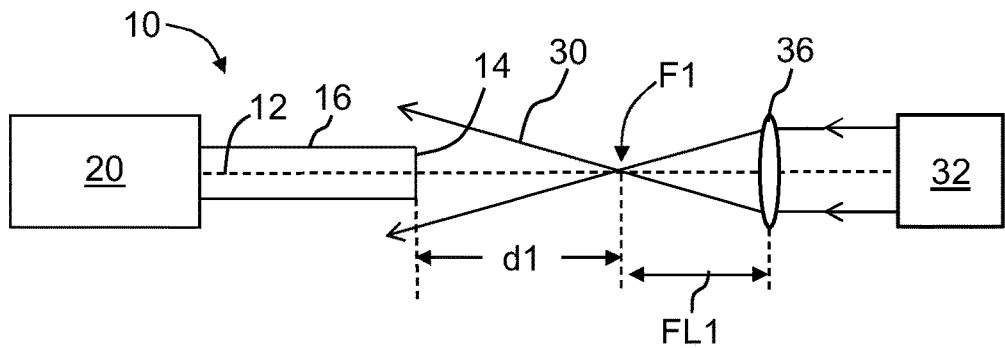
FIG. 3 is similar to FIG. 2 and illustrates a first example embodiment of processing the optical fiber end by exposing it to defocused laser light from a laser.

FIG. 2 is a side view of fiber 10 operably arranged in a fiber support structure (i.e., a jig) 20 so that fiber end 14 can be processed. FIG. 3 is similar to FIG. 2 and illustrates a first example embodiment of processing fiber end 14 by exposing it to laser light (i.e., a laser beam) 30 from a laser 32. In an example, laser 32 is a $CO_2$ laser and laser light 30 has an infrared (IR) wavelength, e.g., nominally 10.6 µm. In an example, a suitable focusing lens 36 of focal length FL1 is used to focus laser light 30 at a focus F1. In an example, focus F1 is located at a distance d1 from fiber end 14. In an example, distance d1 is in the range $300\ \mu m \le d1 \le 500\ \mu m$ when focusing lens 36 has an F/# in the range from about 10 to about 12. Thus, in one example, end 14 of optical fiber 10 is processed using defocused laser light 30, i.e., the fiber end is not located at the most intense part of the otherwise focused laser beam.

Figure 4A:
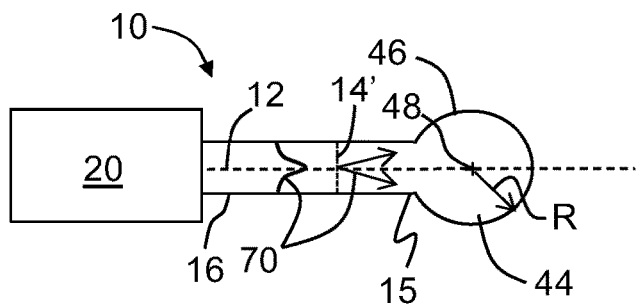
FIG. 4A shows a bulbous tip formed by heating the end of the optical fiber with laser light to the point where surface tension causes the glass that makes up the fiber to form the bulbous tip.

FIG. 4A shows a bulbous tip 44 formed by heating fiber end 14 with laser light 30 as described above to the point where surface tension causes the glass that makes up the fiber to form the bulbous tip. The bulbous tip 44 has a refractive index n, an outer surface 46 and a center 48. The bulbous tip 44 has a (nominal) radius R that in an example is in the range from about 70 microns to about 500 microns. The bulbous tip 44 is formed integrally with fiber 10, i.e., the tip is not added on to the fiber as a separate element. The fiber 10 and bulbous tip 44 thus define a unitary structure. The bulbous tip 44 defines a transition location 15 with respect to the portion of fiber 10 that remains substantially cylindrical.

The exposure time necessary to form bulbous tip 44 depends on the F/# of focusing lens 36, the distance d1 from fiber end 14 to focus F1 and the amount of power in laser beam 30 at the fiber end. The parameters needed to form bulbous tip 44 so that it has a substantially spherical shape can be determined empirically. In an example, fiber end 14 is processed within an atmosphere of inert gas (e.g., $N_2$) to prevent oxidization. In an example, laser 32 outputs laser beam 30 having a total power in the range from 5 W to 50 W, focusing lens 36 has an F/# of about 10, the distance d1 is about 300 µm, and the exposure time is about 1 second.

The bulbous tip 44 can be formed using heating means other than laser 32, such as by a flame or an arc of a splice unit, for example. However, using additional or more complex physical processes to form bulbous tip 44 tends to increase the cost of the process, and these physical processes may also prove more difficult to implement.

In forming bulbous tip 44, the "new" fiber end 14 does not necessarily correspond to the location of transition location 15. This is because the heating process used to form bulbous tip 44 generally blends the glass that makes up the portion of fiber 10 adjacent the bulbous tip. Accordingly, FIG. 4A shows an effective fiber end 14' that forms when bulbous tip 44 is formed. The effective fiber end 14' is the position within fiber 10 wherein light 70 that travels therein can be thought of as transitioning from a guided wave to a diverging light beam. In actuality, this transition may not be abrupt since the heating of fiber 10 may cause a gradual change in the size of the fiber core and fiber cladding until the distinction between these otherwise distinct glass regions disappears. The location of effective fiber end 14' can be controlled to some degree during the heating process used to form bulbous tip 44.

Figure 4B:
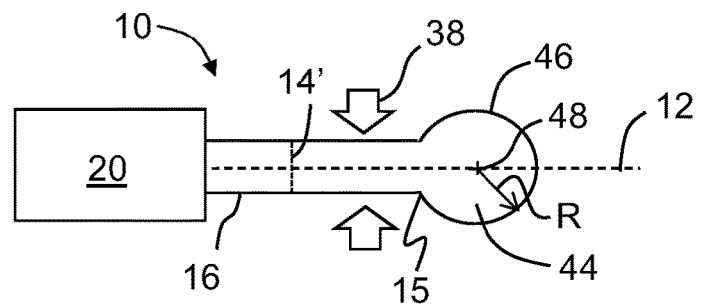
FIG. 4B is similar to FIG. 4A and shows heat being applied to a portion of the optical fiber adjacent the bulbous tip to define a location for the effective fiber end of the optical fiber.

FIG. 4B illustrates an example embodiment wherein the location of effective fiber end 14' in fiber 10 is defined by the controlled application of heat 38 to the fiber to blend the otherwise distinct glass regions of the core and cladding. The heat 38 can be from a laser (e.g., laser 32) or other known heating means. In an example, heat 38 is applied to the circumference of fiber 10 to achieve uniform heating of the fiber. In another example, fiber 10 is rotated (e.g., by rotating fiber support structure 20) to achieve uniform heating of the fiber.

Figure 5:
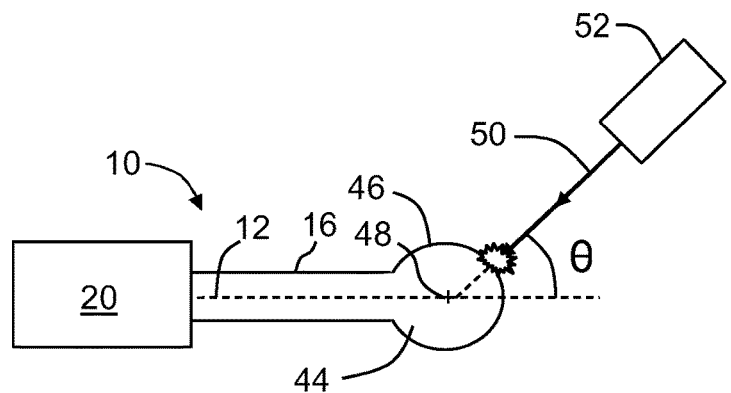
FIG. 5 shows a laser being made incident upon the bulbous tip at a select angle $\theta$ in the process of forming a facet via laser cleaving.
Figure 6:
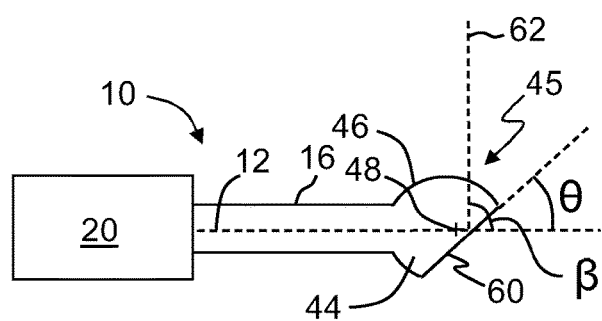
FIG. 6 is similar to FIG. 5 and shows the facet formed by the laser cleaving.
Figure 7:
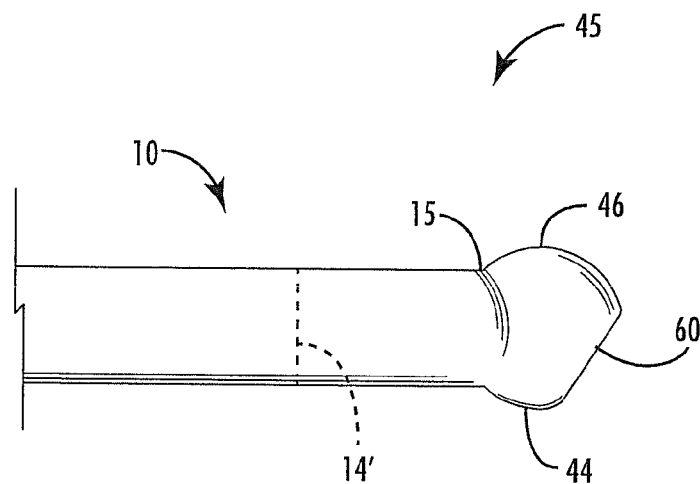
FIG. 7 is a photograph that shows an example faceted TIR optical fiber lens.

Once bulbous tip 44 has been formed, it is cleaved. In an example, a laser is used to perform the cleaving operation. FIG. 5 shows a laser 52 that emits a laser beam 50 that is incident upon bulbous tip 44 at a select angle $\theta$ relative to fiber first axis 12. FIG. 6 shows a facet 60 that is formed as a result of the laser cleaving process of FIG. 5. The facet 60 has substantially the aforementioned angle $\theta$ relative to first axis 12. The angle $\theta$ is thus referred to herein as the "facet angle." FIG. 7 is a photograph that shows an example TIR lens 45 formed by fiber 10, bulbous tip 44 and facet 60.

Figure 8:
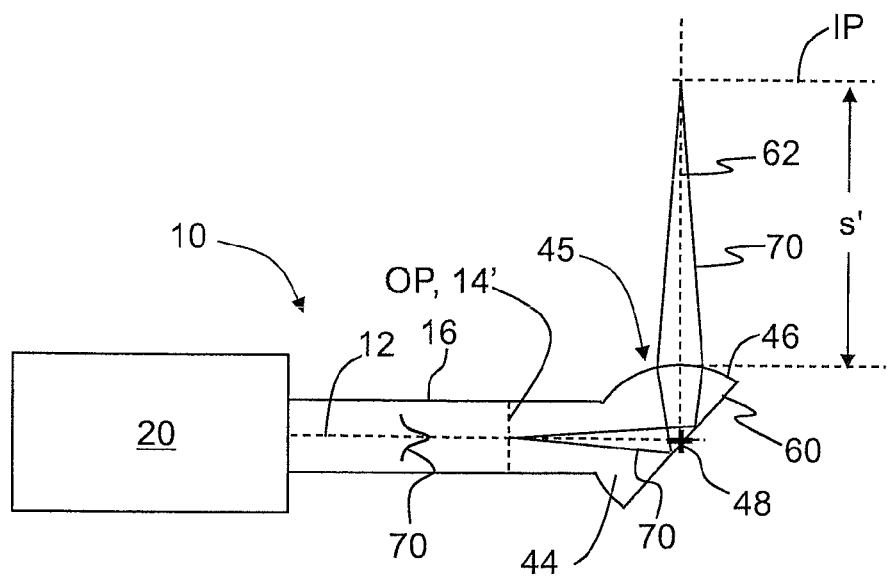
FIG. 8 is a schematic diagram similar to FIG. 6 that shows an example faceted TIR optical fiber lens, wherein the facet intersects the center of the bulbous tip, and also shows image and object planes.

FIG. 8 is a schematic diagram similar to FIG. 6 that shows an example TIR lens 45 wherein facet 60 intersects center 48 of bulbous tip 44. Thus, a folded second axis 62 and first axis 12 intersect at center 48 of bulbous tip 44.

Because facet 60 defines a TIR surface, it serves to form second axis 62 that intersects first axis 12 at an angle $\beta$ (see FIG. 6). While for ease of illustration angle $\beta$ is shown as being nearly 90°, angle $\beta$ is defined by the facet angle $\theta$ and need not be 90°. The second axis 62 can be considered a folded axis, and facet 60 can be considered an optical turning surface. The TIR lens 45 has a focal length f, an object plane OP and an image plane IP. The optical power $\phi$ of TIR lens 45 is defined by $1/f$. The image plane IP resides outside of bulbous tip 44. The image distance s' is defined as the distance along axis 62 from lens surface 46 to image plane IP.

The facet angle $\theta$ is such that light 70 traveling generally along first axis 12 or folded second axis 62 within a reasonable angular range can undergo total-internal reflection (TIR) at facet 60 within bulbous tip 44. For a silica-based fiber 10, bulbous tip 44 is made substantially of silica, which has a refractive index n of about 1.45 at the infrared wavelengths transmitted by most optical fibers. The critical angle $\phi_C$ associated with this refractive index and measured relative to the surface normal of the surface in question is given by $\phi_C$=arcsin (1/1.45)≈44°. For bulbous tip 44, this translates into a critical facet angle $\theta_C$=90°−$\phi_C$. In the above example, $\theta_C$=90°−44°=46°. For a facet angle $\theta$>$\theta_C$, there will be no TIR within bulbous tip 44. Thus, in an example embodiment, facet angle $\theta$ is such that the TIR condition within bulbous tip 44 is satisfied, i.e., $\theta$≤$\theta_C$. In an example embodiment, the facet angle $\theta$ is the range defined by 25°≤$\theta$≤46°.

Light traveling in fiber 10 as guided light 70 can be described as diverging starting substantially at effective fiber end 14', which in an example defines an object plane OP. A configuration where facet 60 intersects center 48 of bulbous tip 44 ensures that diverging light 70 reflected via TIR by the facet and then focused by the remaining portion of surface 46 of the bulbous tip is centered and symmetrical relative to folded second axis 62. The light 70 thus forms the smallest possible focus spot at image plane IP. An example range for focal length f is defined by 100 μm ≤f ≤500 μm, while in another example the range is defined by 125 μm ≤f ≤200 μm.

Figure 9A:
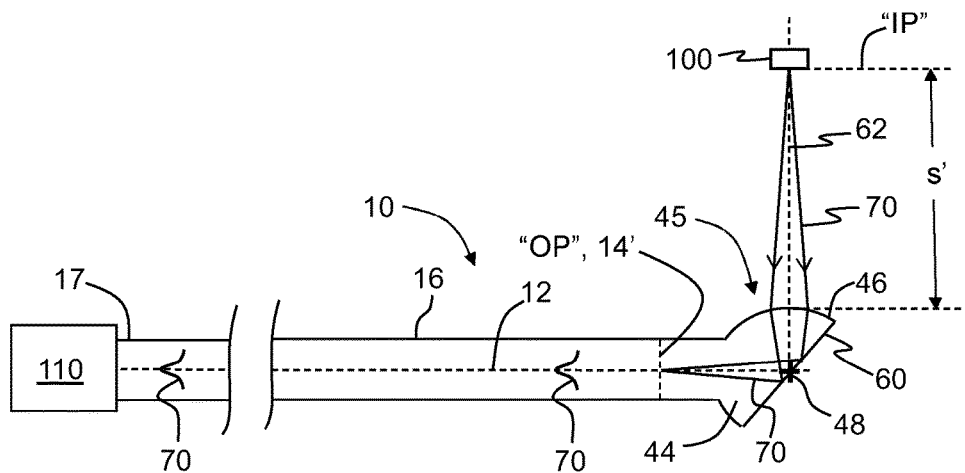
FIG. 9A is a schematic diagram similar to FIG. 8 and shows a light source arranged substantially at the image plane of the faceted TIR optical fiber lens and a photodetector operably arranged at an opposite end of the optical fiber.

FIG. 9A is a schematic diagram similar to FIG. 8 and shows a light source 100 arranged along folded second axis 62 substantially at image plane IP. A photodetector 110 is shown operably arranged at an opposite end 17 of fiber 10. The light source 100 emits light 70 along folded second axis 62 toward TIR lens 45. The light 70 diverges as it travels toward TIR lens 45 and is focused by the curved outer surface 46 of the TIR lens. This focused light 70 is reflected from facet 60 via TIR and forms an image of light source 100 substantially at effective fiber end 14' of fiber 10. This light 70 then travels down fiber 10 as guided light and is detected at photodetector 110 at fiber end 17. In FIG. 9A, the image plane "IP" and object plane "OP" are in quotes because the imaging process is taking place in the opposite direction as originally described above with respect to FIG. 8. This reversal of the imaging process is possible because the image and object planes IP and OP are conjugate planes.

Figure 9B:
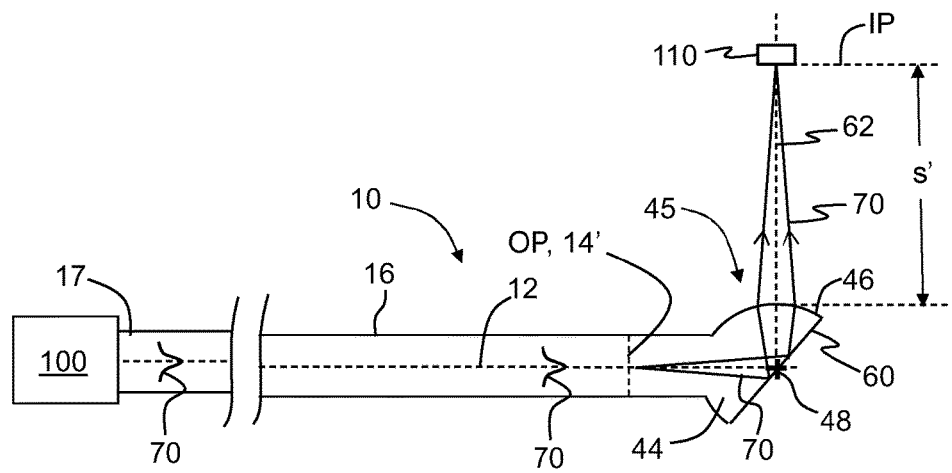
FIG. 9B is similar to FIG. 9A, but with the positions of the light source and photodetector switched.

FIG. 9B is similar to FIG. 9A and shows a configuration wherein the locations of light source 100 and photodetector 110 are switched. Thus, photodetector 110 is arranged along folded second axis 62 substantially at image plane IP. The light source 100 is operably arranged at fiber end 17. The TIR lens 45 is formed with facet 60 passing through center 48. The light 70 from light source 100 enters fiber 10 at fiber end 17 and travels in the fiber as a guided wave. The light 70 diverges when it reaches effective fiber end 14', which as noted above defines object plane OP. The diverging light 70 reflects from facet 60 via TIR and is directed along folded second axis 62. The reflected light 70 pass through a portion of curved outer surface 46, which acts to focus the light and form an image substantially at image plane IP. The image is then detected by photodetector 110.

Figure 10A:
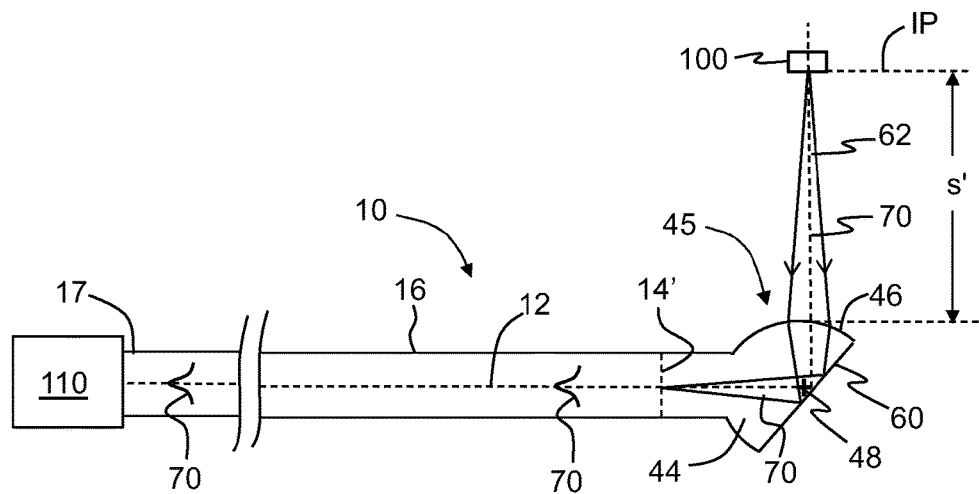
FIGS. 10A and 10B are similar to FIGS. 9A and 9B, but show example faceted TIR optical fiber lenses, wherein the facet does not pass through the center of the bulbous tip.
Figure 10B:
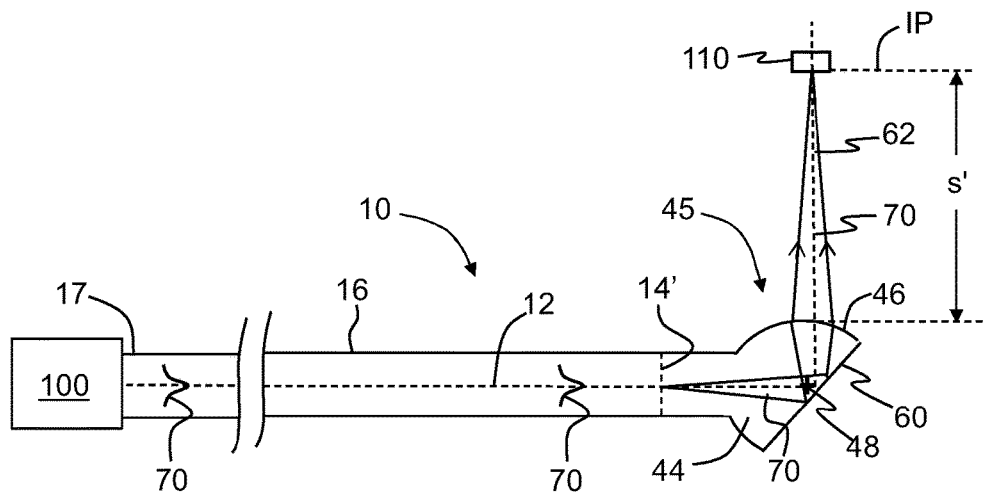

In an example of TIR lens 45, facet 60 does not intersect center 48 of bulbous tip 44. FIGS. 10A and 10B are similar to FIGS. 9A and 9B, except that in FIGS. 10A and 10B the facet 60 of TIR lens 45 is offset from center 48. In such a case, the resulting image at image plane IP will be elongated in one direction (i.e., it will be asymmetrical). This asymmetry can be used to match the output of light source 100 or the receiving pattern (i.e., light-sensitive area) of photodetector 110.

For example, with reference to FIG. 10B, a fast photodiode detector 110 with an elongate photosensitive area can be used to increase saturation behavior by maximizing the surface area (i.e., by having a long axis) while maintaining fast response time (i.e., by having a short axis along which charges are removed). The same is true for the reverse path of FIG. 10A, where light source 110 in the form of a VCSEL can have an asymmetric light-emission profile and thus be more efficiently coupled to fiber 10.

Thus, an aspect of the disclosure includes a method of directing light from light source 100. The method includes coupling light 70 from light source 100 into fiber 10. The method also includes light 70 diverging starting substantially at effective fiber end 14'. This diverging light 70 is then reflected by facet 60 by TIR to direct the light along second axis 62 and through a portion of curved outer surface 46 of TIR lens 45. The method further includes forming an image at image plane IP, which resides outside of the TIR lens.

Another aspect of the disclosure is a method of directing light 70 from light source 100 into fiber 10. The method includes operably arranging light source 100 relative to TIR lens 45 along second axis 62. The method also includes directing light 70 from light source 100 along second axis 62 and passing the light through a portion of lens surface 46 to focus the light and then reflect this light from facet 60 via TIR. The TIR light 70 then forms an image substantially at effective fiber end 14' of fiber 10. This light 70 then enters optical fiber 10 and travels down the optical fiber as guided light.

Design Examples

Figure 11:
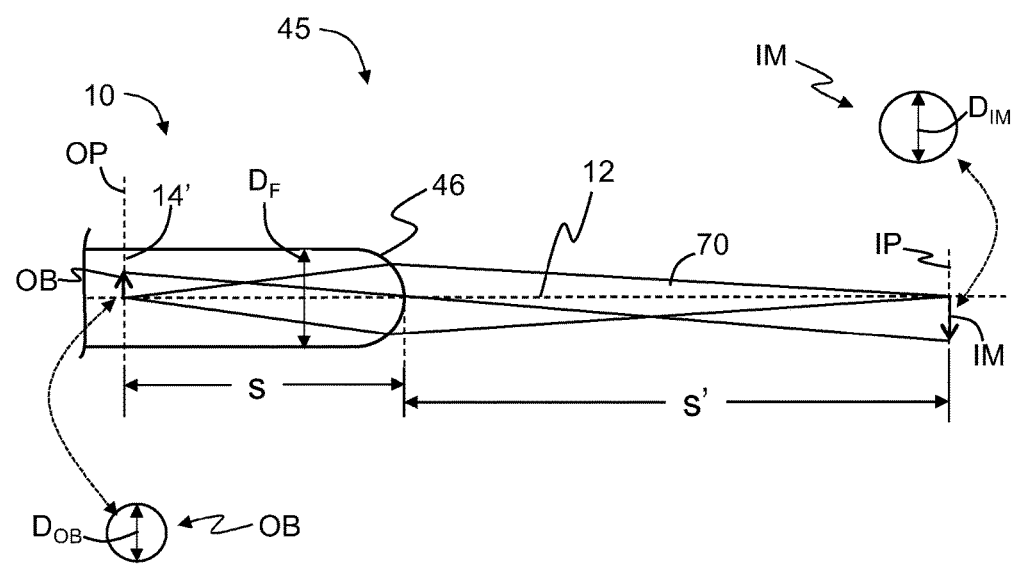
FIG. 11 is a schematic diagram of the unfolded optical system that represents the faceted TIR optical fiber lens in connection with setting forth two example lens designs.

FIG. 11 is a schematic diagram of TIR lens 45 as an optical system that includes image plane IP and object plane OP, which as noted above is defined by effective fiber end 14'. An example arrow object OB is shown at object plane OP, and the corresponding example arrow image IM is shown at image plane IP.

In practice, the object OB is a circle of light of diameter $D_{OB}$ at effective fiber end 14'. The diameter $D_{OB}$ corresponds to the size of the mode of guided light 70, which in an example is the mode-field diameter of the guided light as defined by the $1/e^2$ intensity drop off. For SP-28 single-mode fiber 10, the diameter $D_{OB}$ is about 9 microns.

The image IM is also a circle of light (or "light spot" or "focus spot") having a nominal diameter $D_{IM}$. The relative sizes of the light-spot object OB and corresponding light-spot image IM are related through the magnification M of TIR lens 45 via the relationship M=$D_{IM}/D_{OB}$. The optical axis of TIR lens 45 is represented by axis 12 since the axis is unfolded. The reversal of the orientation of image IM and object OB relative to axis 12 indicates a negative magnification.

The axial distance from object plane OP to lens surface 46 (i.e., the object distance) is denoted by s, and the distance from the lens surface to the image plane IP (i.e., the image distance) is denoted by s'. The refractive index of optical fiber 10 is assumed to be a constant value n between the object plane OP and lens surface 46. The refractive index of the medium between lens surface 46 and image plane IP is denoted n'.

The two equations of interest for TIR lens 45 as depicted in FIG. 11 are:

$$n'/s'=(n'/f)+(n/s) \text{ and}$$

$$1/f=(n-1)/R,$$

where f is the focal length, and R is the radius of curvature of lens surface 46. It is assumed that the radius R of lens surface 46 will not be smaller than the fiber diameter $D_F$, which in an example is 62.5 microns. In an example, radius R can be in the range from about 70 microns to about 500 microns. In an example, object distance s can be in the range defined by 100 µm≤s≤2,000 µm. Also in an example, image distance s' can be in the range defined by 200 µm≤s'≤4000 µm A first example of TIR lens 45 has the design parameters as set forth below in Design Table 1, with the distance parameters given in microns and the sign of the distance parameters measured relative to the apex of lens surface 46.

DESIGN TABLE 1

| Parameter | Value |
|---|---|
| n | 1.4469 |
| n' | 1 |
| s | −500 |
| s' | 635 |
| f | 224 |
| R | −100 |
| M | −1.84 |

For a single-mode fiber that has a $D_{OB}$ of about 9 microns, the diameter $D_{IM}$ for spot image IM at image plane IP is about 16 microns. These design parameters are suitable for cardiac OCT applications, as well as for VCSEL telecommunication transmitters.

A second example embodiment of TIR lens 45 is set forth in Design Table 2 below.

DESIGN TABLE 2

| Parameter | Value |
|---|---|
| n | 1.4469 |
| n' | 1 |
| s | −800 |
| s' | 1840 |
| f | 425 |
| R | −190 |
| M | −3.33 |

The image diameter $D_{IM}$ is about 30 microns if a single-mode fiber 10 with a diameter $D_{OB}$ of about 9 microns is used. This size for image IM is well matched to the photo-sensitive area of a high-speed photodiode.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of forming a faceted total-internal-reflection (TIR) optical fiber lens on an end of an optical fiber having a first axis and a core and a cladding, comprising:
    heating the fiber end to form a bulbous tip and an effective fiber end at a first location adjacent the bulbous tip;
    allowing the bulbous tip to cool, the bulbous tip having a refractive index, a center and a curved outer surface;
    laser cleaving the cooled bulbous tip to form a facet that intersects the first axis at a facet angle θ that defines the facet as a TIR surface; and
    heating a portion of the optical fiber immediately adjacent the first location to blend the core and cladding to move the effective fiber end to a second location that is farther away from the bulbous tip than the first location.

2. The method of claim 1, wherein the facet angle θ is in a range defined by 25°≤θ≤46°.

3. A method according to claim 1, wherein the facet intersects the center of the bulbous tip.

4. A method according to claim 1, wherein heating the fiber end includes irradiating the fiber end with laser light having an infrared wavelength.

5. A method according to claim 4, further comprising bringing the laser light to a focus, wherein the focus is at a distance d1 from the fiber end, wherein 100 µm≤d1≤300 µm.

6. A method according to claim 1, wherein the faceted TIR optical fiber lens has a focal length f, and wherein 100 µm≤f≤500 µm.

7. A method according to claim 1, wherein the bulbous tip has a radius R in the range from 70 microns ≤R≤500 microns.

8. A method according to claim 1, wherein the bulbous tip includes silica.

9. A method according to claim 1, wherein the second location of the effective fiber end resides at an axial distance s from the curved outer surface, wherein 100 µm≤s≤2,000 µm.

10. A method according to claim 1, wherein a curved surface of the bulbous tip defines a first conjugate plane adjacent the curved surface and a second conjugate plane within the optical fiber adjacent the TIR surface, and wherein the effective fiber end at the second location resides at the second conjugate plane.

11. A method according to claim 1, wherein the TIR lens has a working distance s' defined as an axial distance between the curved outer surface and an image plane, and wherein 200 µm≤s'≤4000 µm.

12. A method according to claim 1, further comprising:
    coupling light into the faceted TIR optical fiber lens along one of the first and second axes; and
    detecting the light along the other of the first and second axes.

13. A method of forming a faceted total-internal-reflection (TIR) optical fiber lens on an end of an optical fiber having a first axis, a core and a cladding, comprising:
    heating the fiber end with a defocused infrared laser beam to form a bulbous tip and an effective fiber end at a first location adjacent the bulbous tip, the bulbous tip having a refractive index, a center and a curved outer surface having a radius of curvature R, wherein 70 µm≤R≤500 µm;
    allowing the bulbous tip to cool; and
    laser cleaving the bulbous tip to define a TIR facet for light traveling along the first axis, wherein the curved outer surface and the refractive index define a focal length f of the TIR lens, wherein 100 µm≤f≤200 µm; and
    heating a portion of the optical fiber immediately adjacent the first location to blend the core and cladding to move the effective fiber end to a second location that is farther away from the bulbous tip than the first location.

14. A method according to claim 13, wherein the defocused laser beam is formed by bringing laser light to a focus at a distance dl from the fiber end, wherein 100 µm≤d1≤300 µm.

15. A method according to claim 13, wherein the second location of the effective fiber end resides at an axial distance s from the curved outer surface, wherein 100 µm≤s≤2,000 µm.

16. A method according to claim 13, wherein a curved surface of the bulbous tip defines a first conjugate plane adjacent the curved surface and a second conjugate plane within the optical fiber adjacent the TIR surface, and wherein the effective fiber end at the second location resides at the second conjugate plane.

17. A method according to claim 13, wherein the TIR lens has a working distance s' defined as an axial distance between the curved outer surface and an image plane, and wherein 200 μm≤s'≤4000 μm.

18. A method according to claim 13, wherein the bulbous tip has a center, and wherein the facet passes through the center.

19. A method according to claim 13, wherein the facet defines a second axis, and further comprising:
- coupling light into the faceted TIR optical fiber lens along one of the first and second axes; and
- detecting the light along the other of the first and second axes.

\* \* \* \* \*